US011999591B1

(12) United States Patent
Roberts et al.

(10) Patent No.: US 11,999,591 B1
(45) Date of Patent: Jun. 4, 2024

(54) ELEVATOR SYSTEM INCLUDING SENSOR ASSEMBLY FOR PERSON DETECTION

(71) Applicant: Otis Elevator Company, Farmington, CT (US)

(72) Inventors: Randy Roberts, Hebron, CT (US); Johanna Whitwell, Hartford, CT (US); James Tilsley Auxier, Palm Beach Gardens, FL (US); Kathleen Nicole Moore, West Hartford, CT (US); Kyler Vensel, Wolcott, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/333,258

(22) Filed: Jun. 12, 2023

(51) Int. Cl.
*B66B 5/00* (2006.01)

(52) U.S. Cl.
CPC ............ *B66B 5/005* (2013.01); *B66B 5/0031* (2013.01); *B66B 5/0087* (2013.01)

(58) Field of Classification Search
CPC ...... B66B 5/005; B66B 5/0031; B66B 5/0087
See application file for complete search history.

(56) References Cited

U.S. PATENT DOCUMENTS

| | | | | |
|---|---|---|---|---|
| 6,202,797 | B1 * | 3/2001 | Skolnick | B66B 5/005 187/391 |
| 10,112,802 | B2 * | 10/2018 | Dube | B66B 5/005 |
| 2020/0039784 | A1 * | 2/2020 | Oggianu | B66B 5/005 |

FOREIGN PATENT DOCUMENTS

| | | | | |
|---|---|---|---|---|
| CN | 112551282 A * | 3/2021 | | B66B 1/06 |
| CN | 115402902 A * | 11/2022 | | B66B 1/3415 |
| EP | 3848317 A1 * | 7/2021 | | B66B 1/3461 |
| WO | WO-2007040538 A1 * | 4/2007 | | B65B 5/005 |
| WO | WO-2009073001 A1 * | 6/2009 | | B66B 5/0043 |
| WO | WO-2017157469 A1 * | 9/2017 | | B66B 5/005 |
| WO | WO-2023274684 A1 * | 1/2023 | | |

* cited by examiner

*Primary Examiner* — Diem M Tran
(74) *Attorney, Agent, or Firm* — CANTOR COLBURN LLP

(57) ABSTRACT

An elevator system includes a hoistway; an elevator car configured to travel in the hoistway; a pit located at a bottom of the hoistway; a safety chain configured to enable or disable motion of the elevator car; and a sensor assembly configured to initiate opening the safety chain to disable motion of the elevator car upon detection of a person in the pit.

16 Claims, 9 Drawing Sheets

ELEVATOR SYSTEM INCLUDING SENSOR ASSEMBLY FOR PERSON DETECTION

BACKGROUND

The embodiments described herein relate to elevator systems, and more particularly, to an elevator system including one or more sensor assemblies to detect a person in a pit of the elevator system.

Persons, such as maintenance personnel, may need to enter the pit of an elevator hoistway for inspection, maintenance, etc. Numerous safety measures exist to prevent injury to persons in the pit. Additional safety measures, although not necessary, may be beneficial.

SUMMARY

According to an embodiment, an elevator system includes a hoistway; an elevator car configured to travel in the hoistway; a pit located at a bottom of the hoistway; a safety chain configured to enable or disable motion of the elevator car; and a sensor assembly configured to initiate opening the safety chain to disable motion of the elevator car upon detection of a person in the pit.

In addition to one or more of the features described herein, or as an alternative, further embodiments may include wherein the sensor assembly is configured to open the safety chain upon detecting the person in the pit and detecting that the safety chain is closed.

In addition to one or more of the features described herein, or as an alternative, further embodiments may include wherein the sensor assembly is configured to generate an alarm upon detecting the person in the pit and detecting that the safety chain is closed.

In addition to one or more of the features described herein, or as an alternative, further embodiments may include a run-stop interface in the pit, the run-stop interface configured to open or close the safety chain upon activation by the person.

In addition to one or more of the features described herein, or as an alternative, further embodiments may include wherein the sensor assembly includes at least one sensor that measures distances to objects in the pit.

In addition to one or more of the features described herein, or as an alternative, further embodiments may include wherein the at least one sensor includes at least one of a LIDAR sensor, a millimeter wave RADAR sensor and an RGBD camera.

In addition to one or more of the features described herein, or as an alternative, further embodiments may include wherein the sensor assembly includes a sensor assembly safety chain contact as a component of the safety chain.

In addition to one or more of the features described herein, or as an alternative, further embodiments may include a second sensor assembly configured to open the safety chain to disable motion of the elevator car upon detection of the person in the pit.

In addition to one or more of the features described herein, or as an alternative, further embodiments may include wherein the second sensor assembly includes a second sensor assembly safety chain contact as a component of the safety chain.

In addition to one or more of the features described herein, or as an alternative, further embodiments may include a second hoistway; a second elevator car configured to travel in the second hoistway; a second pit located at a bottom of the second hoistway; a second safety chain configured to enable or disable motion of the second elevator car; and a second sensor assembly configured to initiate opening the second safety chain to disable motion of the second elevator car upon detection of the person in the second pit.

In addition to one or more of the features described herein, or as an alternative, further embodiments may include wherein the sensor assembly and the second sensor assembly are in communication.

In addition to one or more of the features described herein, or as an alternative, further embodiments may include wherein the sensor assembly, upon detection of the person in the pit, sends a communication to the second sensor assembly.

In addition to one or more of the features described herein, or as an alternative, further embodiments may include wherein in response to the communication, the second sensor assembly increases sensitivity to detect the person in the second pit.

In addition to one or more of the features described herein, or as an alternative, further embodiments may include wherein increasing the sensitivity of the second sensor assembly includes at least one of (i) decreasing a threshold used to detect the person in the second pit, (ii) increasing a frame rate of the second sensor assembly, (iii) reducing a field of view of the second sensor assembly and (iv) increasing a resolution of the second sensor assembly.

In addition to one or more of the features described herein, or as an alternative, further embodiments may include wherein upon the person not being present in the pit or the second pit for a pre-defined period of time, the second sensor assembly resets the sensitivity to detect the person in the second pit to an initial value.

In addition to one or more of the features described herein, or as an alternative, further embodiments may include closing the safety chain in the pit.

In addition to one or more of the features described herein, or as an alternative, further embodiments may include wherein in response to actuation of a run-stop interface in the pit, the sensor assembly sends a communication to the second sensor assembly to increase sensitivity to detect the person in the second pit.

In addition to one or more of the features described herein, or as an alternative, further embodiments may include wherein in response to opening of the safety chain in the pit, the sensor assembly sends a communication to the second sensor assembly to increase sensitivity to detect the person in the second pit.

According to an embodiment, a method of operating an elevator system including a hoistway, an elevator car configured to travel in the hoistway, a pit located at a bottom of the hoistway, a safety chain configured to enable or disable motion of the elevator car and a sensor assembly, the method includes detecting, by the sensor assembly, a person in the pit; and upon detection of a person in the pit, the sensor assembly initiating opening the safety chain to disable motion of the elevator car.

According to another embodiment, a computer program embodied on a non-transitory computer-readable storage medium, the computer program including instructions for causing a processor to implement a process for operating an elevator system including a hoistway, an elevator car configured to travel in the hoistway, a pit located at a bottom of the hoistway, a safety chain configured to enable or disable motion of the elevator car and a sensor assembly, the process including detecting, by the sensor assembly, a person in the pit; and upon detection of a person in the pit, the sensor assembly initiating opening the safety chain to disable motion of the elevator car.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
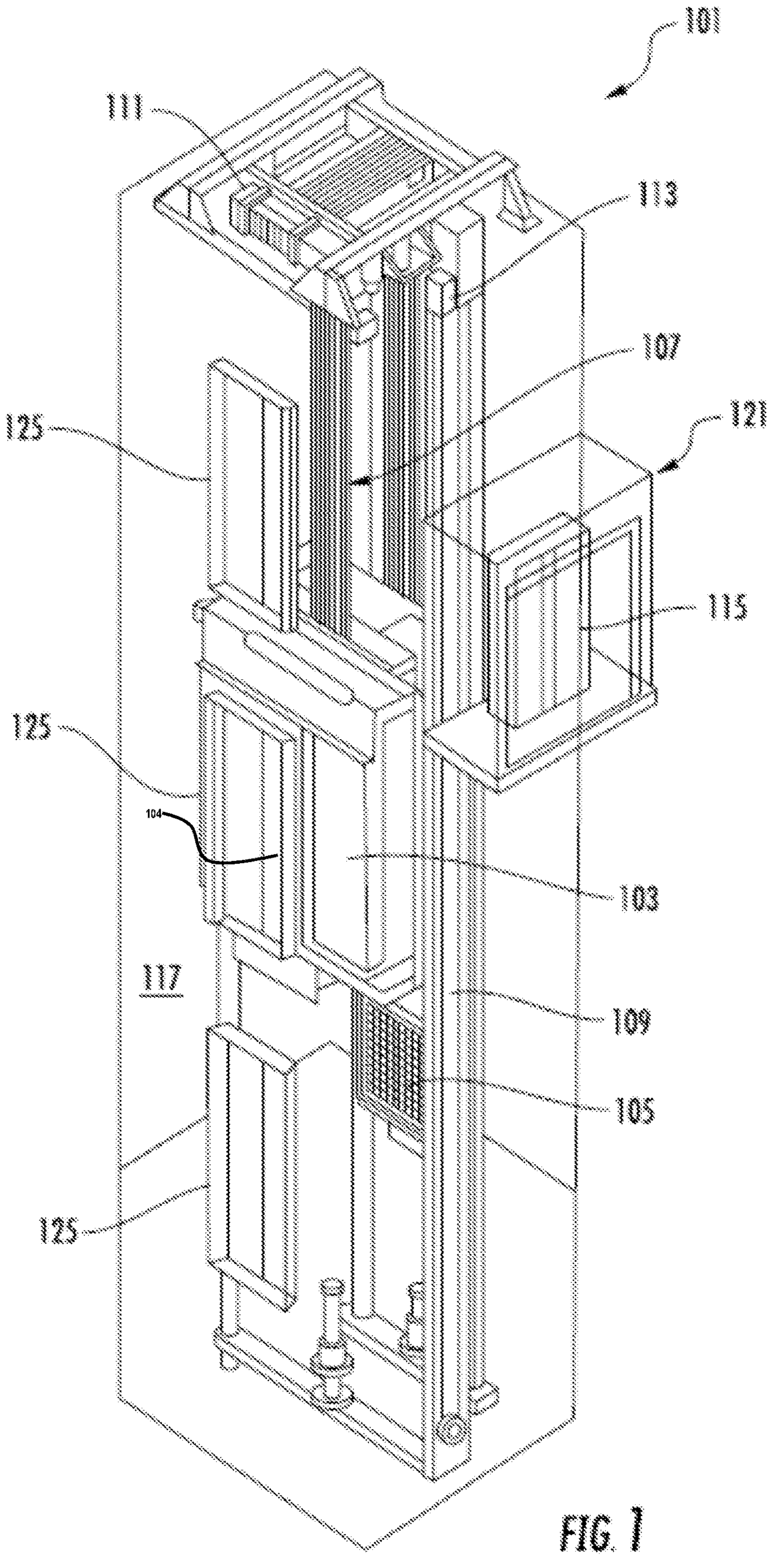
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft or hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 may be located, as shown, in a controller room 121 of the elevator shaft 117 and is configured to control the operation of the elevator system 101, and particularly the elevator car 103. It is to be appreciated that the controller 115 need not be in the controller room 121 but may be in the hoistway or other location in the elevator system. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller 115 may be located remotely or in a distributed computing network (e.g., cloud computing architecture). The controller 115 may be implemented using a processor-based machine, such as a personal computer, server, distributed computing network, etc.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

The elevator system 101 also includes one or more elevator doors 104. The elevator door 104 may be attached to the elevator car 103 or the elevator door 104 may be located on a landing 125 of the elevator system 101, or both. Embodiments disclosed herein may be applicable to both an elevator door 104 attached to the elevator car 103 or an elevator door 104 located on a landing 125 of the elevator system 101, or both. The elevator door 104 opens to allow passengers to enter and exit the elevator car 103.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

Figure 2A:
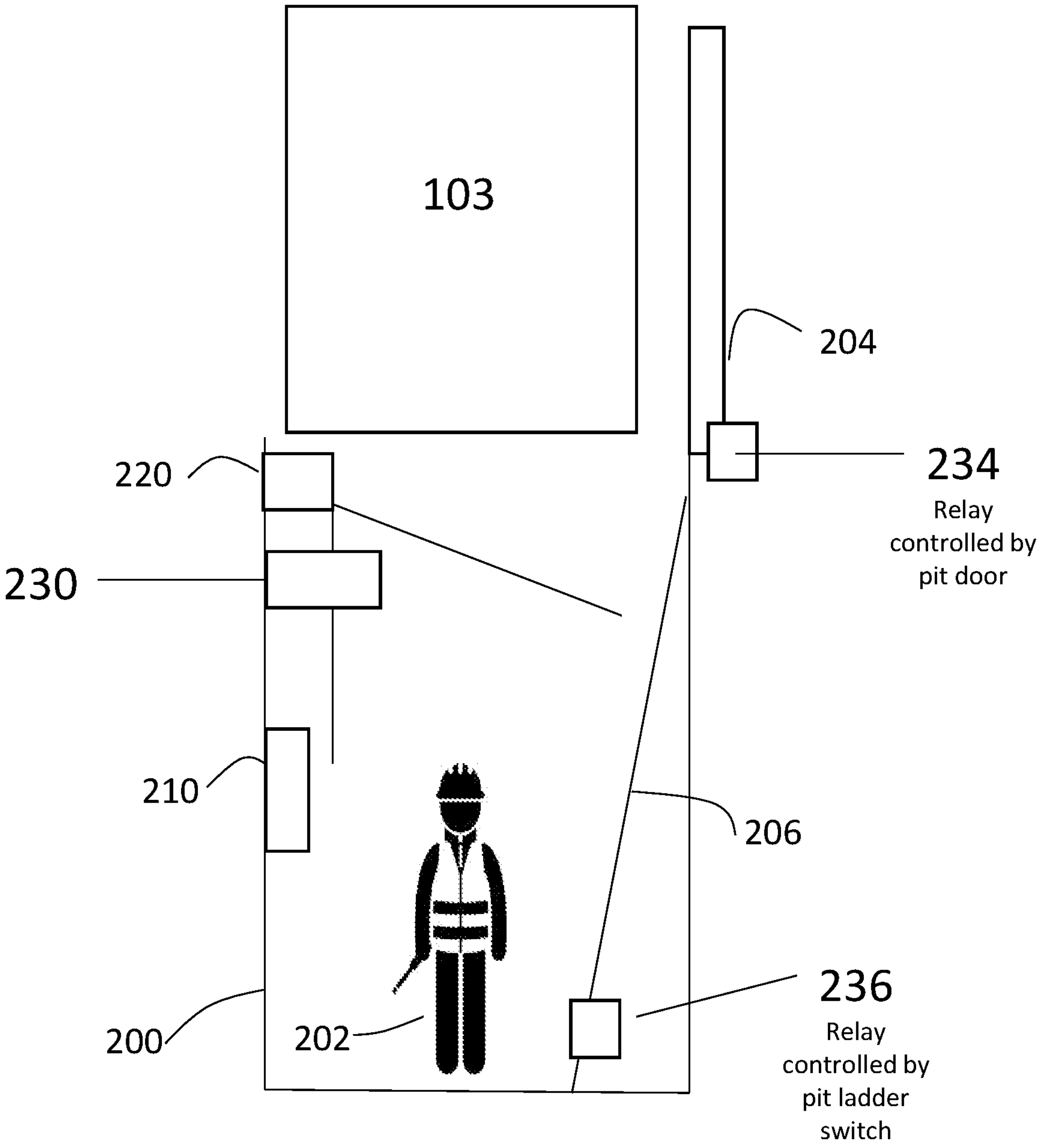
FIG. 2A depicts an elevator pit in accordance with an embodiment.

FIG. 2A depicts an elevator pit 200 in accordance with an embodiment. The elevator pit 200 is located at the bottom of the hoistway 117 and includes equipment that may need to be accessed or inspected by a person 202. Access to the pit 200 is through an access door 204, which may be a door at the lowest landing of the building or another door. A ladder 206 provides for entry to and exit from the pit 200. A sensor assembly 220 monitors the pit 200 for the presence of person(s) 202. A run-stop interface 210 is provided in the pit 200. The run-stop interface 210 is manually operated by the person 202 to open or close a safety chain of the elevator system 101. When the safety chain is opened, the elevator car 103 is prevented from moving.

The elevator pit 200 in FIG. 2A includes safety chain contacts, including a sensor assembly safety chain contact 230, pit door safety chain contact 234 and a pit ladder safety chain contact 236. If any of the safety chain contacts 230, 234 and 236 are open, the elevator car 103 will be prevented from moving. Also, if the run-stop interface 210 is open, the elevator car 103 will be prevented from moving. In some embodiments, the pit ladder safety chain contact 236 may be implemented using the sensor assembly 220 for detection of a person 202 on the ladder 206.

Figure 2B:
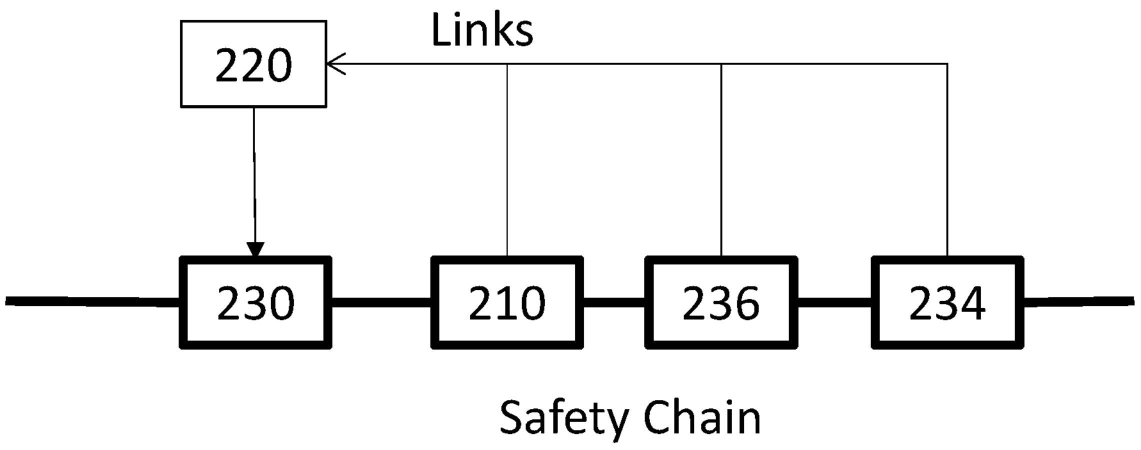
FIG. 2B depicts safety chain contacts of an elevator pit in accordance with an embodiment.

FIG. 2B depicts safety chain contacts 230, 234 and 236 and the run-stop interface 210 of the elevator pit 200 in accordance with an embodiment. The safety chain contacts 230, 234 and 236 and the run-stop interface 210 are part of a safety chain of the elevator system 101. If any of the safety chain contacts 230, 234 and 236 and the run-stop interface 210 is "open", then movement of the elevator car 103 is prevented. The safety chain contacts 230, 234 and 236 and the run-stop interface 210 are connected to the sensor assembly 220 by links so that the sensor assembly 220 can detect the status (e.g., open or closed) of each of the safety chain contacts 230, 234 and 236 and the run-stop interface 210. The links may be wired and/or wireless connections that allows the sensor assembly 220 to detect the status of each of the safety chain contacts 230, 234 and 236 and the run-stop interface 210.

Figure 3:
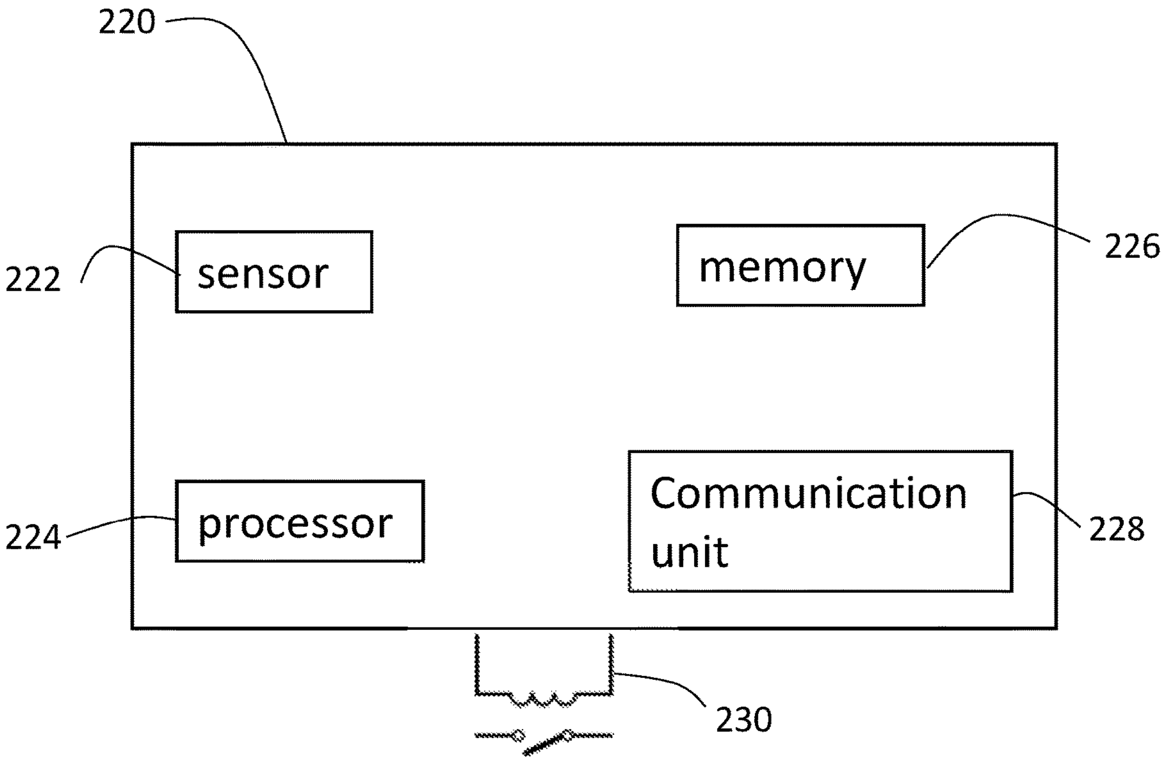
FIG. 3 depicts a sensor assembly in accordance with an embodiment.

FIG. 3 depicts a sensor assembly 220 in accordance with an embodiment. The sensor assembly 220 includes one or more sensors 222. The sensor 222 may be a distance sensor that generates distance measurements in a two-dimensional or three-dimensional field of view. The sensor 222 may be implemented using a LIDAR sensor, a millimeter wave RADAR sensor, an RGBD camera or other distance measuring sensors. The sensor assembly 220 includes a processor 224 that controls operation of the sensor assembly 220. The processor 224 may be implemented using a general-purpose microprocessor executing a computer program stored on a storage medium to perform the operations described herein. Alternatively, the processor 224 may be implemented in hardware (e.g., ASIC, FPGA) or in a combination of hardware/software. The processor 224 allows the sensor assembly 220 to perform computations locally, also referred to as edge computing. The processor 224 can send commands to other components of the elevator system 101 based on a result of the local computations.

The sensor assembly 220 includes a memory 226 that may store a computer program executable by processor 224, reference data, sensor data, etc. The memory 226 may be implemented using known devices such a random access memory. The sensor assembly 220 includes a communication unit 228 which allows the sensor assembly 220 to communicate with other components of the elevator system 101, such as other sensor assemblies and/or the elevator controller 115. The communication unit 228 may be implemented using wired connections (e.g., LAN, ethernet, twisted pair, etc.) or wireless connections (e.g., WiFi, NFC, BlueTooth, etc.).

In operation, the sensor assembly 220 can open a safety chain of the elevator system 101 under certain conditions. A safety chain is a known component of elevator systems, and typically includes a number of contacts (e.g., relays) in series that control power to the elevator system machine 111 to enable or disable movement of the elevator car 103. If any of the contacts of the safety chain are open, then the elevator car 103 is prevented from moving. In an example embodiment, the sensor assembly 220 can control the sensor assembly safety chain contact 230 in order to open or close the safety chain. It is understood that sensor assembly safety chain contact 230 is one of several contacts making up the safety chain.

Figure 4:
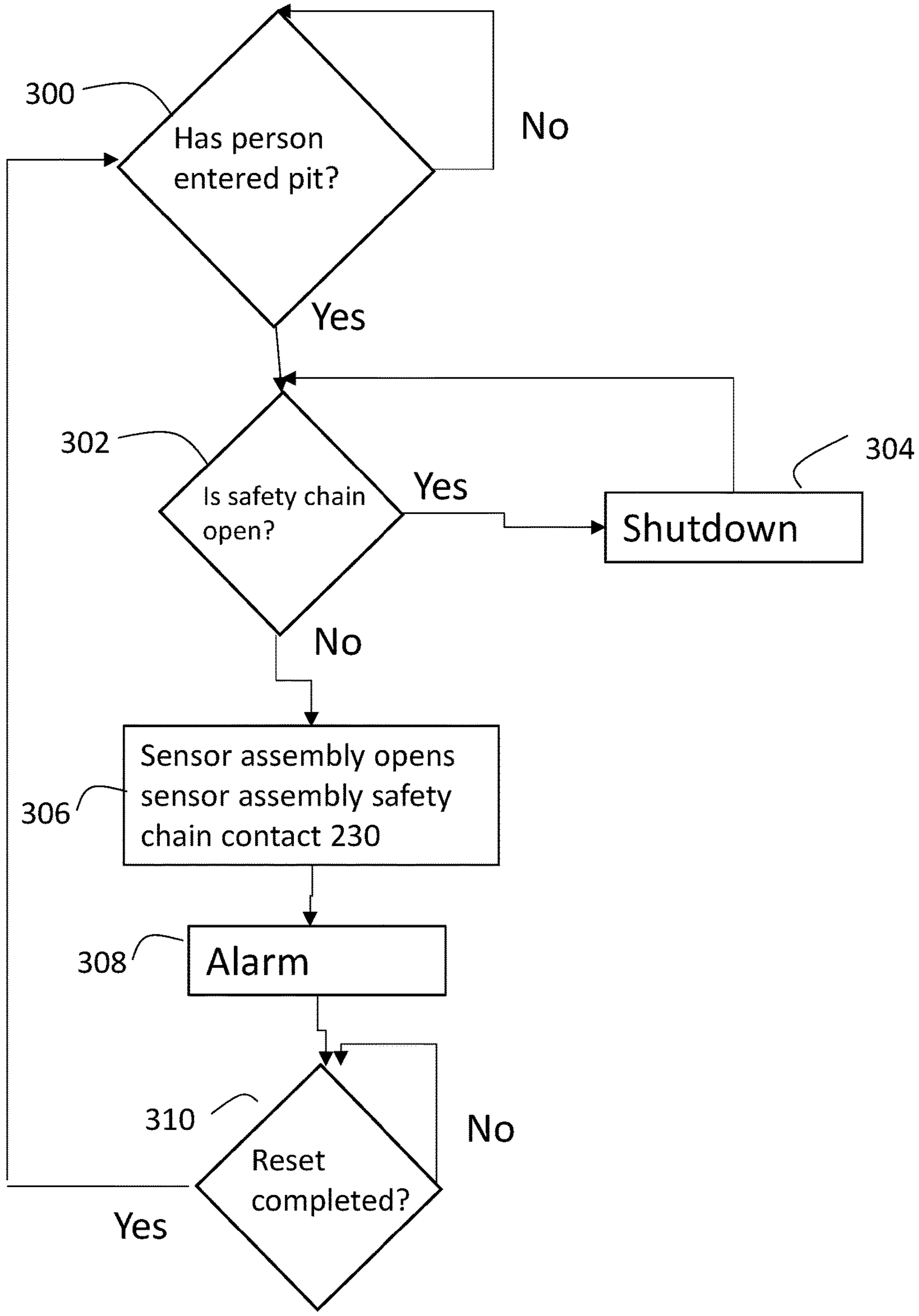
FIG. 4 depicts a flowchart of a process for monitoring an elevator pit in accordance with an embodiment.

FIG. 4 depicts a flowchart of a process of a sensor assembly 220 monitoring a pit 200 in accordance with an embodiment. At 300, the sensor assembly 220 determines if a person 202 has entered the pit 200. The sensor assembly 220 can detect the presence of the person 202 by comparing the distance measurements from the sensor 222 to a threshold. Background distance measurements are collected to establish the baseline when no person 202 is in the pit 200. A person 202 can then be classified by the processor 224 as they appear in the foreground (in front of) the learned ambient background. The distance data obtained by the sensor 222 can be compared to a threshold to confirm that the person 202 is present. The presence or a direction of travel of the person 202 may also be determined (e.g., by comparing point distributions across multiple frames of a field of view) to verify if person 202 is present in the pit 200. In one example, the distance measurements define a point cloud in the field of view. A number of points within a certain distance (e.g., within the interior walls of the pit) greater than the threshold indicates a person is in the pit 200.

Once a person has entered the pit 200, flow proceeds to 302 where the sensor assembly 220 determines if the safety chain is open. The safety chain may be opened by the person 202 pressing the run-stop interface 210 to manually open the safety chain. The sensor assembly 220 may determine that the safety chain is open by signals received over the links with the each of the safety chain contacts 230, 234 and 236 and the run-stop interface 210.

If the safety chain is open at 302, flow proceeds to 304 where the sensor assembly 220 enters a shutdown mode. As the safety chain is open, there is no need for active monitoring of the pit 200 by the sensor assembly 220.

If at 302 the safety chain is not open, flow proceeds to 306 where the sensor assembly 220 initiates opening of the safety chain. This sensor assembly 220 opens the safety chain by opening the sensor assembly safety chain contact 230.

From 306, flow proceeds to 308 where an alarm is generated to indicate that the person 202 entered the pit 200 but the safety chain is not open. The alarm may be generated to the person 202 in the pit 200 by an audible or visual indicator (not shown).

From 308, the process flows to 310 where the sensor assembly 220 waits for a reset function to be completed. The reset function can be performed in two ways, either manually or automatically. For a manual reset of the sensor assembly 220, a person opens the safety chain with run-stop interface 210 and the pit door safety chain contact 234. The sensor assembly 220 confirms opening of the safety chain by signals received over the links with the pit door safety chain contact 234 and the run-stop interface 210. Next, the person will press a button on sensor assembly 220 to enable its manual reset. The sensor assembly 220 will have a time delay when it switches into this reset mode to enable the person 202 to move out of the pit 200 without being detected by the sensor assembly 220. The reset button for sensor assembly 220 could be outside the pit 200.

For an automatic reset, again, this can only be done if the run-stop interface 210 and the pit door safety chain contact 234 are tripped and the safety chain is open. The sensor assembly 220 then determines there is no one in the pit. If the sensor assembly 220 determines that no person 202 is in the pit 200, the sensor assembly 220 goes into a reset mode after some amount of time to again allow the person to disengage the run-stop interface 210 and close the pit door safety chain contact 234 (i.e., closing the safety chain).

The process of FIG. 4 both ensures safety of the person 202 in the pit 200 (by opening the safety chain if needed) and alerts the person 202 if the proper procedure for entering the pit 200 was not followed.

Figure 5:
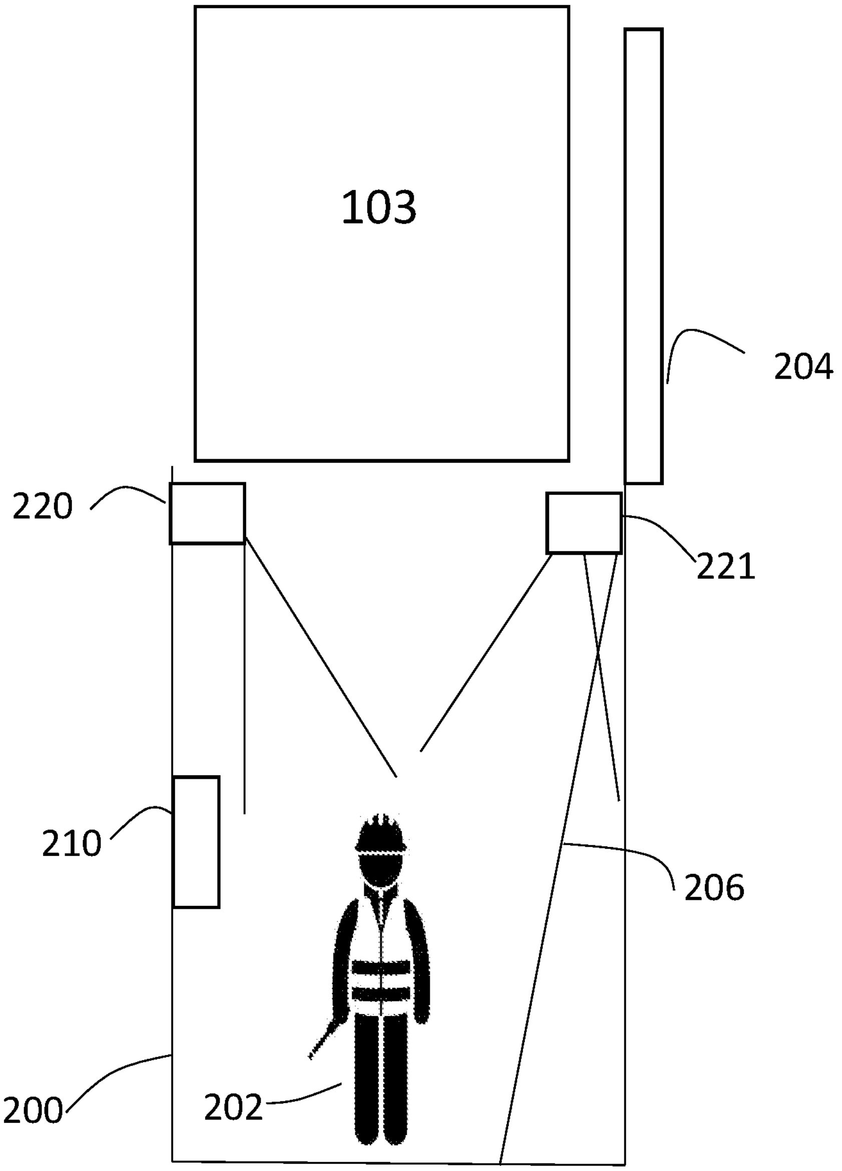
FIG. 5 depicts an elevator pit equipped with two sensor assemblies in accordance with an embodiment.

FIG. 5 depicts a pit equipped with two sensor assemblies 220 and 221 in accordance with an embodiment. In this embodiment, either sensor assembly 220 or sensor assembly 221 can initiate opening of the safety chain, as described with reference to FIG. 4. The use of two sensor assemblies 220 and 221 may be needed in environments where a single sensor assembly cannot provide adequate sensing of the entire pit 200. If sensor assemblies 220 and 221 include a respective sensor assembly safety chain contact 230, the sensor assembly safety chain contacts 230 are connected in series (also referred to as daisy chained) so that opening either of the sensor assembly safety chain contacts 230 opens the safety chain.

Figure 6A:
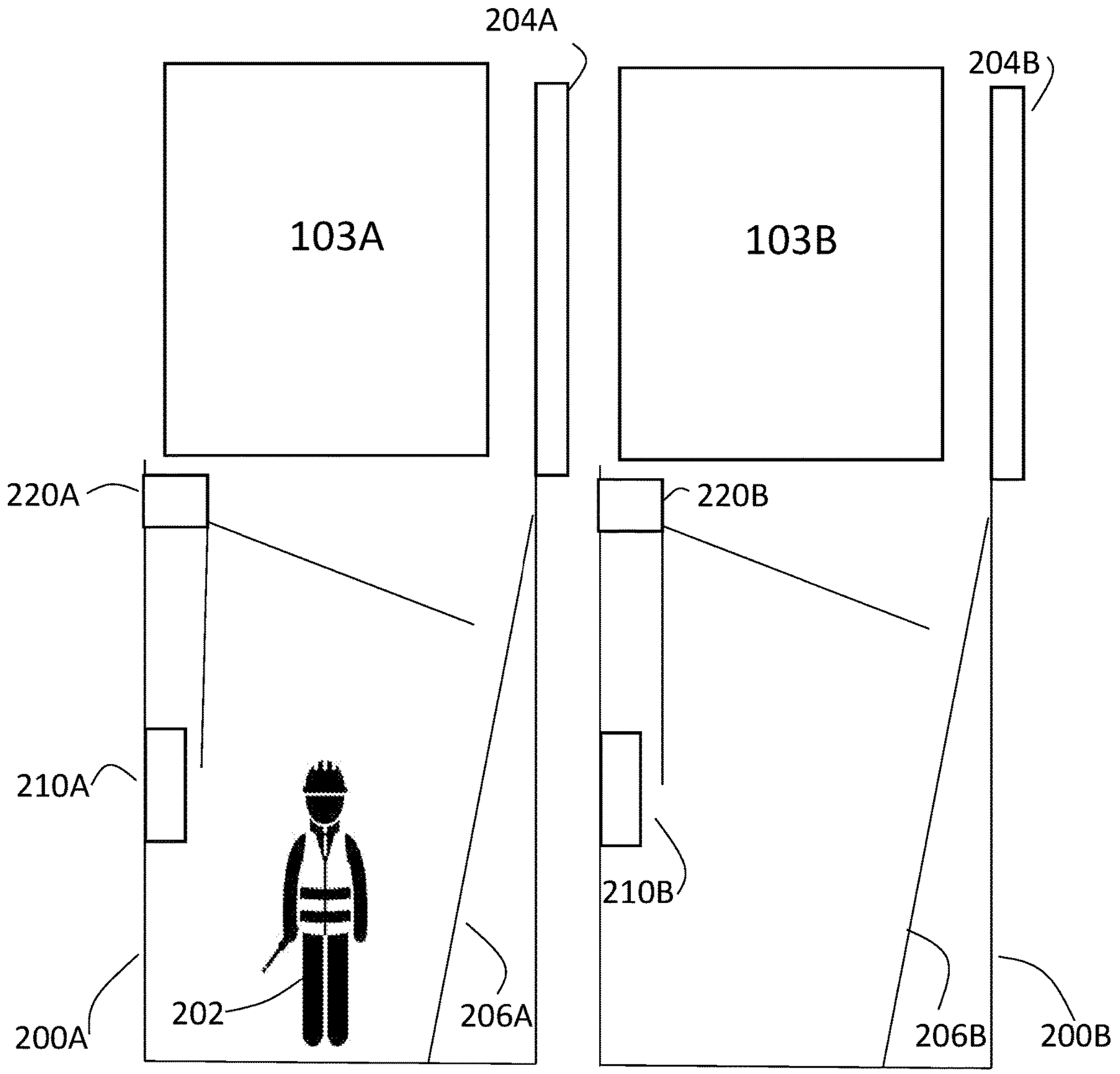
FIG. 6A depicts two elevator pits in accordance with an embodiment.

FIG. 6A depicts an elevator system having two hoistways, two elevator cars 103A and 103B and two adjacent elevator pits 200A and 200B in an example embodiment. Although two pits 200A and 200B are shown in FIG. 6A, embodiments operate with any number of pits. In the example of FIG. 6, both pits 200A and 200B include the components described with reference to FIG. 2. Each pit includes a sensor assembly, labeled 220A and 220B, respectively.

Figure 6B:
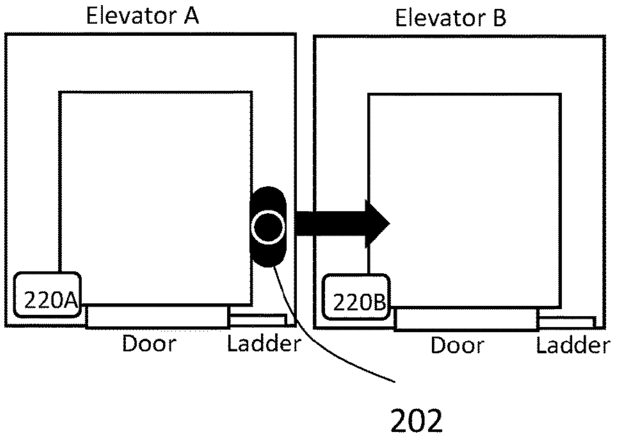
FIG. 6B depicts motion of a person between two elevator pits in accordance with an embodiment.

In the embodiment of FIG. 6A, the person 202 can travel between pits 200A and 200B via a passage between the pits without having to climb up and down ladders 206. This can result in a situation where the person moves from pit 200A to pit 200B and not be immediately detected by sensor assembly 220B. FIG. 6B is a top down view depicting a person 202 moving between two elevator pits in an example embodiment.

Sensor assembly 220A communicates with sensor assembly 220B to improve the ability to detect the person 202 moving into pit 200B. In an example embodiment, the sensor assembly 220A can open the safety chain for the elevator car 103A in the first hoistway and the sensor assembly 220B can open the safety chain for the second elevator car 103B in the second hoistway. Thus, if a person is present in pit 200A, this does not disrupt operation of the elevator car 103B.

Figure 7:
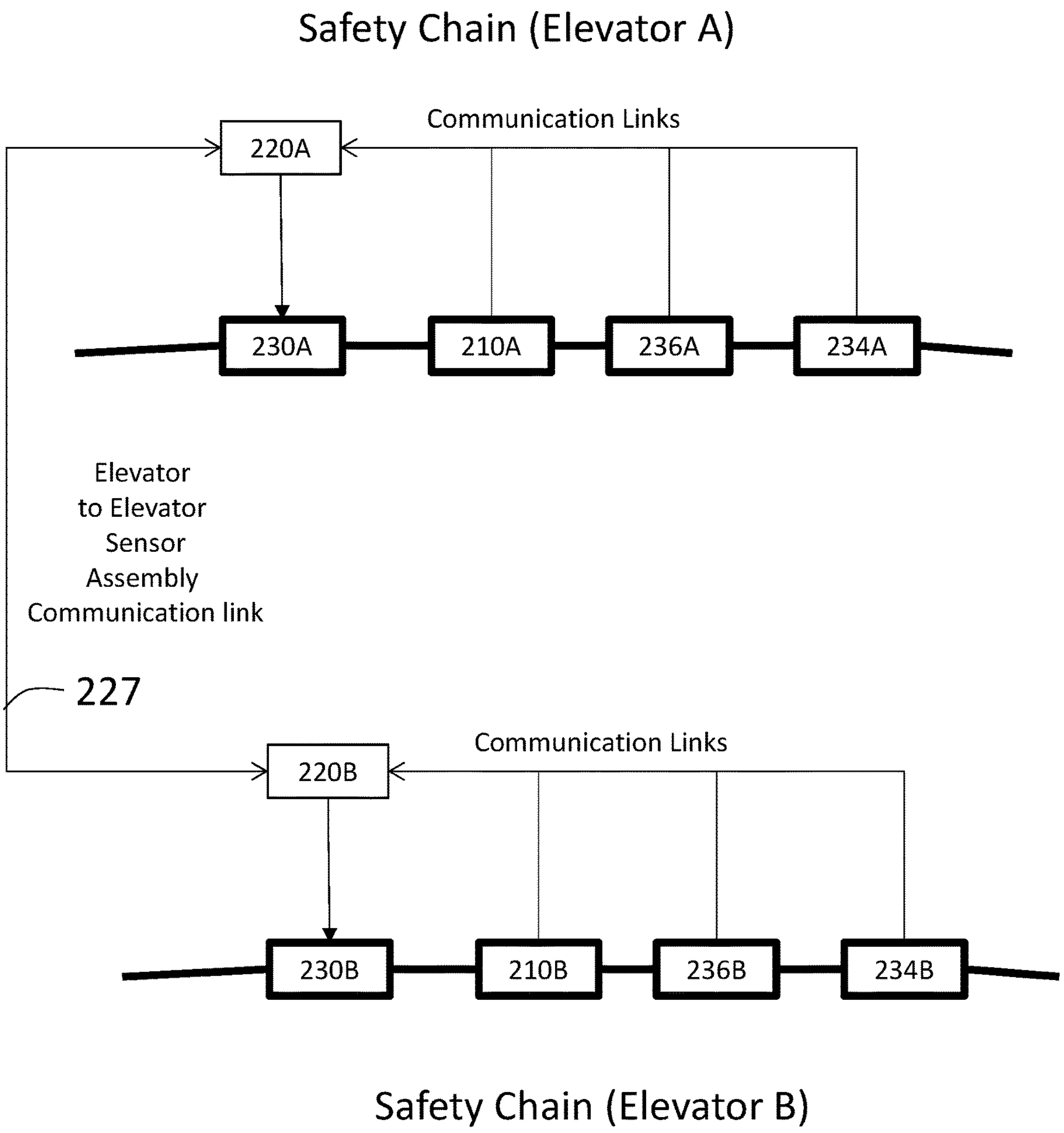
FIG. 7 depicts safety chain contacts of two elevator pits in accordance with an embodiment.

FIG. 7 depicts safety chain contacts of two elevator pits in accordance with an embodiment. Sensor assembly 220A is in communication with a sensor assembly safety chain contact 230A, pit door safety chain contact 234A, a pit ladder safety chain contact 236A and run-stop interface 210A. If any of the safety chain contacts 230A, 234A, 236A or the run-stop interface 210A are open, the elevator car 103A will be prevented from moving. Sensor assembly 220B is in communication with a sensor assembly safety chain contact 230B, pit door safety chain contact 234B, a pit ladder safety chain contact 236B and run-stop interface 210B. If any of the safety chain contacts 230B, 234B, 236B or the run-stop interface 210B are open, the elevator car 103B will be prevented from moving. The sensor assembly 220A and the sensor assembly 220B communicate over a sensor assembly to sensor assembly link 227. The link 227 may be a wired and/or wireless connection that allows each sensor assembly 220A and 220B to communicate a current status to the other sensor assembly 220B and 220A.

Figure 8:
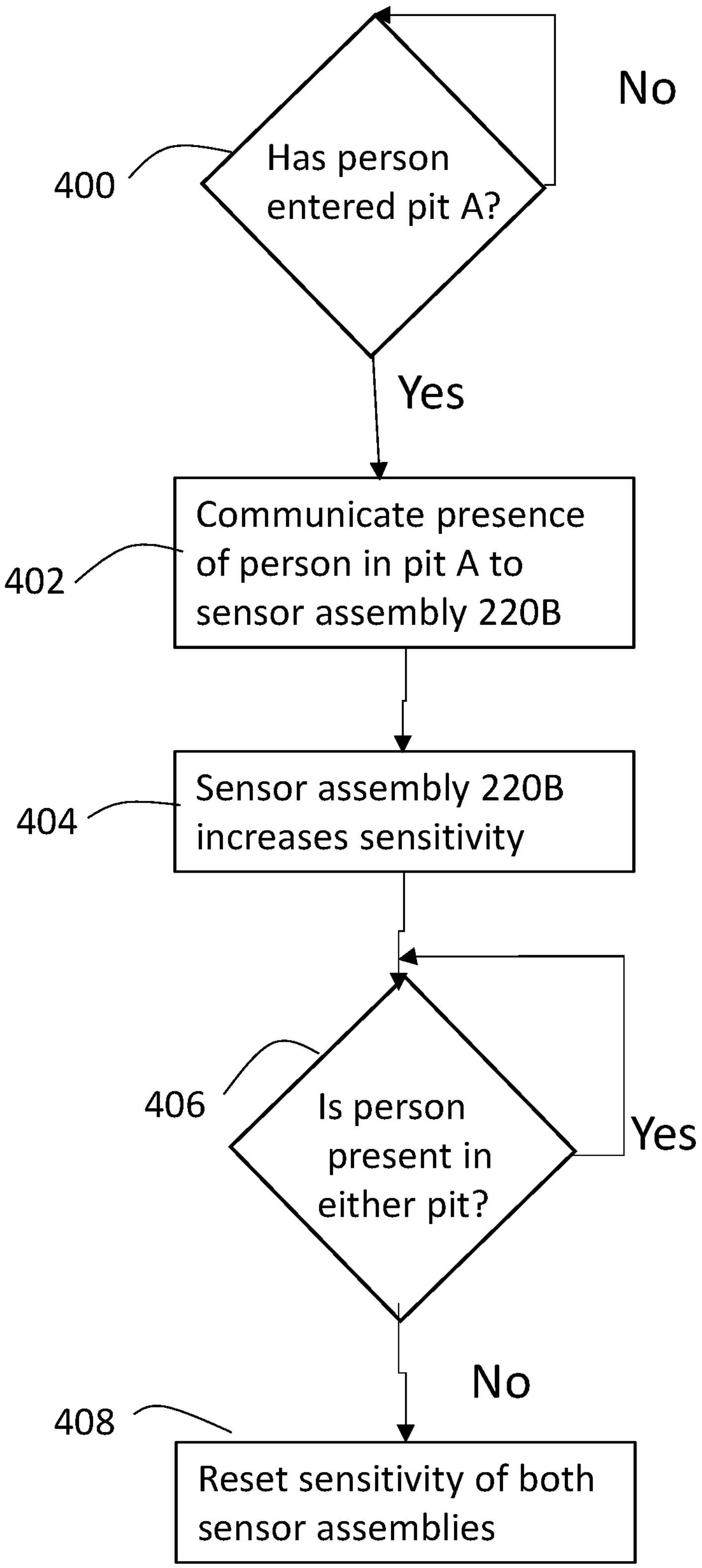
FIG. 8 depicts a flowchart of a process for monitoring two elevator pits in accordance with an embodiment.

FIG. 8 depicts a flowchart of a process for monitoring two pits in accordance with an embodiment. In the example of FIG. 8, the person 202 initially enters pit 200A and then moves into pit 200B. The steps of FIG. 8 may be performed regardless of which pit the person 202 enters first, and may be generally referred to as a first pit and second pit.

At 400, the sensor assembly 220A determines if a person 202 has entered pit 200A. As noted above, this is performed by comparing the distance data from sensor 222 to a threshold. The presence of a person in pit 200A may also be determined by activation of the run-stop interface 210 in pit 200A.

Once the person 202 enters pit 200A, flow proceeds to 402 where the sensor assembly 220A communicates the presence of the person 202 in pit 200A to the sensor assembly 220B. At this point, there is an opportunity for the person 202 to move from pit 200A to pit 200B. To provide early detection of such movement, at 404, a sensitivity of the sensor assembly 220B is increased. One way to increase sensitivity of sensor assembly 220B is to reduce the threshold used to detect the person in pit 200B. For example, if the initial threshold requires five hundred sensed points by sensor 222 to detect the person, the threshold can be reduced such that two hundred sensed points by sensor 222 detects the person 202. Another way to increase sensitivity of the sensor assembly 220B is to increase a frame rate of the sensor assembly 220B. Another way to increase sensitivity of the sensor assembly 220B is to reduce the field of view of the sensor assembly 220B. Another way to increase sensitivity is to increase a resolution of the sensor assembly 220B. Block 404 may also include the sensor assembly 220A increasing sensitivity in pit 200A, in case the person 202 moves back to pit 200A.

At 406, the sensor assembly 220A and sensor assembly 220B communicate to determine that the person 202 is not present in either of pits 200A and 200B. Once the person has exited (e.g., the person 202 is not present is either pit 200A or 200B), flow proceeds to 408 where the sensitivity of both sensor assembly 220A and sensor assembly 220B is reset to the initial level. The sensitivity of both the sensor assembly 220A and the sensor assembly 220B can be reset if no person 202 is detected in pit 200B, a pre-defined period of time has passed, and elevator car 103A has gone back in service with its safety chain closed.

Embodiments described herein allow the sensor assembly to protect persons in the pit while promoting their adherence to safe procedures. This way, the person does not become overly reliant on the sensor assembly to control the car. This adds a dual feature of the sensor assembly as a protective device and a training reinforcement device. Daisy chaining multiple sensor assemblies simplifies and streamlines the system structure needed for the management of multiple sensor assemblies in one pit. Additionally, it improves the robustness of person detection in the pit. In multi-pit systems, communication between sensor assemblies improves the confidence of detection in the system and coverage of protection within the pit(s).

As described above, embodiments can be in the form of processor-implemented processes and devices for practicing those processes, such as a processor 224 in the sensor assembly 220. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:

a hoistway;

an elevator car configured to travel in the hoistway;

a pit located at a bottom of the hoistway;

a safety chain configured to enable or disable motion of the elevator car; and a sensor assembly configured to initiate opening the safety chain to disable motion of the elevator car upon detection of a person in the pit;

a second hoistway;

a second elevator car configured to travel in the second hoistway;

a second pit located at a bottom of the second hoistway;

a second safety chain configured to enable or disable motion of the second elevator car; and a second sensor assembly configured to initiate opening the second safety chain to disable motion of the second elevator car upon detection of the person in the second pit;

wherein the sensor assembly and the second sensor assembly are in communication;

wherein the sensor assembly, upon detection of the person in the pit, sends a communication to the second sensor assembly;

wherein in response to the communication, the second sensor assembly increases sensitivity of the second sensor assembly to detect the person in the second pit.

2. The elevator system of claim 1, wherein the sensor assembly is configured to open the safety chain upon detecting the person in the pit and detecting that the safety chain is closed.

3. The elevator system of claim 1, wherein the sensor assembly is configured to generate an alarm upon detecting the person in the pit and detecting that the safety chain is closed.

4. The elevator system of claim 1, further comprising a run-stop interface in the pit, the run-stop interface configured to open or close the safety chain upon activation by the person.

5. The elevator system of claim 1, wherein the sensor assembly includes at least one sensor that measures distances to objects in the pit.

6. The elevator system of claim 5, wherein the at least one sensor includes at least one of a LIDAR sensor, a millimeter wave RADAR sensor and an RGBD camera.

7. The elevator system of claim 1, wherein the sensor assembly includes a sensor assembly safety chain contact as a component of the safety chain.

8. The elevator system of claim 1, further comprising a second sensor assembly configured to open the safety chain to disable motion of the elevator car upon detection of the person in the pit.

9. The elevator system of claim 8, wherein the second sensor assembly includes a second sensor assembly safety chain contact as a component of the safety chain.

10. The elevator system of claim 1, wherein:

increasing the sensitivity of the second sensor assembly includes at least one of (i) decreasing a threshold used to detect the person in the second pit, (ii) increasing a frame rate of the second sensor assembly, (iii) reducing a field of view of the second sensor assembly and (iv) increasing a resolution of the second sensor assembly.

11. The elevator system of claim 10, wherein:

upon the person not being present in the pit or the second pit for a pre-defined period of time, the second sensor assembly resets the sensitivity to detect the person in the second pit to an initial value.

12. The elevator system of claim 11, further comprising closing the safety chain in the pit.

13. An elevator system comprising:

a hoistway;

an elevator car configured to travel in the hoistway;

a pit located at a bottom of the hoistway;

a safety chain configured to enable or disable motion of the elevator car;

a sensor assembly configured to initiate opening the safety chain to disable motion of the elevator car upon detection of a person in the pit;

a second hoistway;

a second elevator car configured to travel in the second hoistway;

a second pit located at a bottom of the second hoistway;

a second safety chain configured to enable or disable motion of the second elevator car; and a second sensor assembly configured to initiate opening the second safety chain to disable motion of the second elevator car upon detection of the person in the second pit;

wherein in response to actuation of a run-stop interface in the pit, the sensor assembly sends a communication to the second sensor assembly to increase sensitivity of the second sensor assembly to detect the person in the second pit.

14. An elevator system comprising:

a hoistway;

an elevator car configured to travel in the hoistway;

a pit located at a bottom of the hoistway;

a safety chain configured to enable or disable motion of the elevator car;

a sensor assembly configured to initiate opening the safety chain to disable motion of the elevator car upon detection of a person in the pit;

a second hoistway;

a second elevator car configured to travel in the second hoistway;

a second pit located at a bottom of the second hoistway;

a second safety chain configured to enable or disable motion of the second elevator car; and a second sensor assembly configured to initiate opening the second safety chain to disable motion of the second elevator car upon detection of the person in the second pit;

wherein in response to opening of the safety chain in the pit, the sensor assembly sends a communication to the second sensor assembly to increase sensitivity of the second sensor assembly to detect the person in the second pit.

15. A method of operating an elevator system including a hoistway, an elevator car configured to travel in the hoistway, a pit located at a bottom of the hoistway, a safety chain configured to enable or disable motion of the elevator car and a sensor assembly, the method comprising:

detecting, by the sensor assembly, a person in the pit; and upon detection of a person in the pit, the sensor assembly initiating opening the safety chain to disable motion of the elevator car;

wherein in response to opening of the safety chain, the sensor assembly sends a communication to a second sensor assembly to increase sensitivity of the second sensor assembly to detect the person in a second pit.

16. A computer program embodied on a non-transitory computer-readable storage medium, the computer program including instructions for causing a processor to implement a process for operating an elevator system including a hoistway, an elevator car configured to travel in the hoistway, a pit located at a bottom of the hoistway, a safety chain configured to enable or disable motion of the elevator car and a sensor assembly, the process comprising:

detecting, by the sensor assembly, a person in the pit; and upon detection of a person in the pit, the sensor assembly initiating opening the safety chain to disable motion of the elevator car;

wherein in response to opening of the safety chain, the sensor assembly sends a communication to a second sensor assembly to increase sensitivity of the second sensor assembly to detect the person in a second pit.

* * * * *